(12) United States Patent
Agin

(10) Patent No.: US 7,023,830 B1
(45) Date of Patent: Apr. 4, 2006

(54) SPECTRUM SPREADING OR DESPREADING DEVICE, IN PARTICULAR FOR TRANSMISSION IN A CODE DIVISION MULTIPLE ACCESS CELLULAR MOBILE RADIO SYSTEM

(75) Inventor: Pascal Agin, Sucy en Brie (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/291,324

(22) Filed: Apr. 15, 1999

(30) Foreign Application Priority Data

Aug. 12, 1998 (FR) .......................................... 98 10344

(51) Int. Cl.
*H04B 7/216* (2006.01)

(52) U.S. Cl. ....................... 370/342; 375/146; 375/147; 455/422

(58) Field of Classification Search ................. 370/208, 370/209, 320, 345, 342, 335; 455/422, 561, 455/17; 375/130, 140, 146, 147, 144, 135, 375/136, 240.24, 298, 348, 367
See application file for complete search history.

(56) References Cited

U.S. PATENT DOCUMENTS

| | | | | | |
|---|---|---|---|---|---|
| 5,533,012 | A | * | 7/1996 | Fukasawa et al. | 370/342 |
| 5,555,268 | A | | 9/1996 | Fattouche et al. | |
| 5,598,428 | A | * | 1/1997 | Sato | 375/148 |
| 5,943,331 | A | * | 8/1999 | Lavean | 370/335 |
| 5,978,412 | A | * | 11/1999 | Takai | 375/145 |
| 6,041,034 | A | * | 3/2000 | Fukumasa et al. | 370/203 |
| 6,393,047 | B1 | * | 5/2002 | Popovic' | 375/140 |
| 6,430,213 | B1 | * | 8/2002 | Dafesh | 375/146 |
| 6,456,612 | B1 | * | 9/2002 | Kim et al. | 370/342 |
| 6,493,563 | B1 | * | 12/2002 | Ozluturk et al. | 455/522 |

FOREIGN PATENT DOCUMENTS

EP   0 818 901 A2   1/1998

OTHER PUBLICATIONS

Azad, H. et al.: "Multitrate Spread Spectrum Direct Sequence CDMA Techniques" IEEE Colloquium on Spread Spectrum Techniques for Radio Communications Systems (Digest no. 95), Apr. 27, 1993, Apr. 15, 1994, pp. 4/1–4/5, XP0000570787.

* cited by examiner

*Primary Examiner*—Edward F. Urban
*Assistant Examiner*—Charles Craver
(74) *Attorney, Agent, or Firm*—Sughrue Mion, PLLC

(57) ABSTRACT

A spectrum spreading of despreading device, in particular for transmission in a code division multiple access cellular mobile radio system is disclosed. In order to spread or despread an incoming sequence by means of spreading code of length Q, first, the data symbols of the income sequence are distributed into difference sub-sequences, and then each of the sub-sequences are spread or despread using a spreading code of length Q0 that is a multiple of length Q. The sub-sequences and the spreading codes of length Q0 that are applied to them are determined so that the sequence that would be obtained by superimposing the spread or despread sub-sequences obtained in this way is the same as that which would be obtained by spreading or despreading the incoming sequence using the code of length Q.

8 Claims, 4 Drawing Sheets

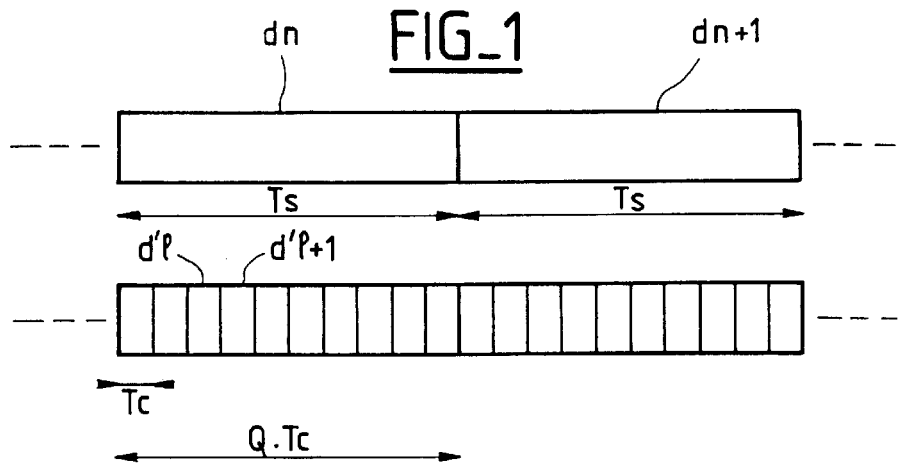
FIG_1
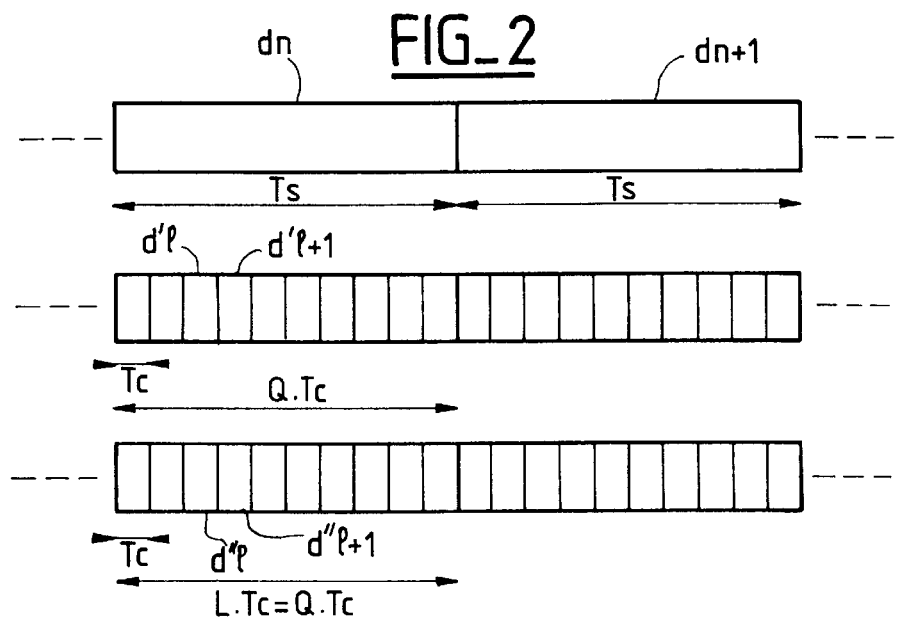
FIG_2
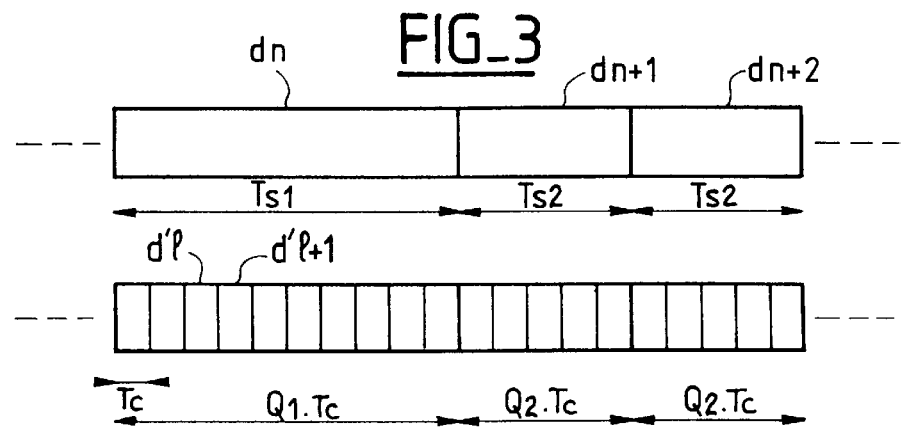
FIG_3

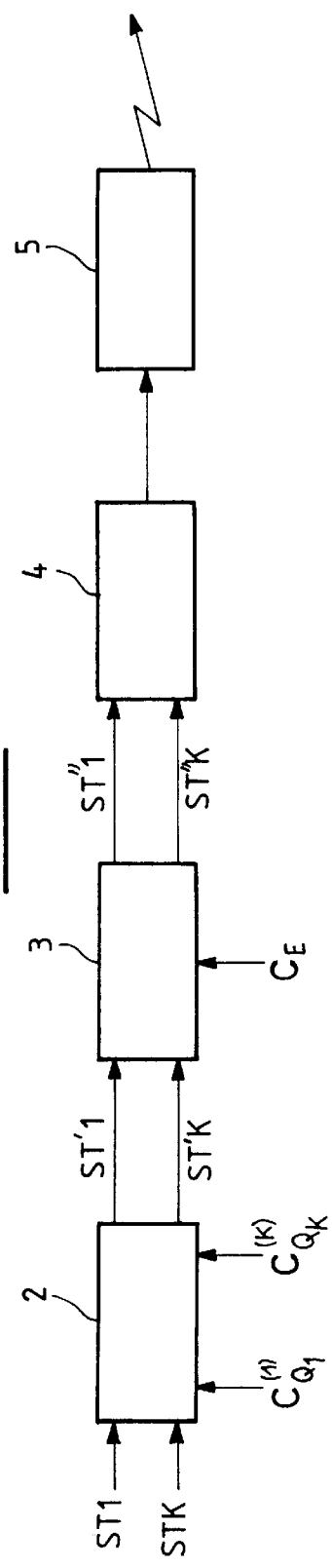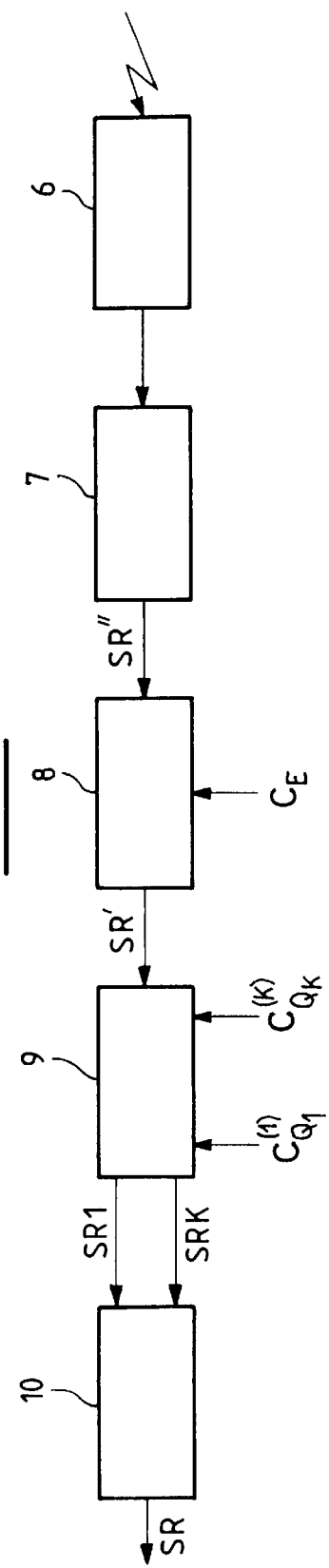

FIG_6
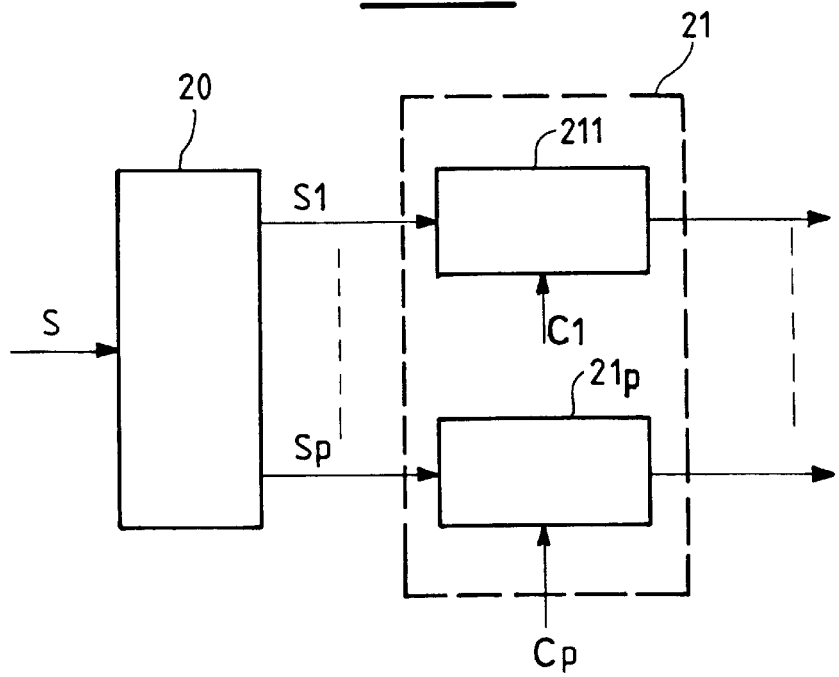
FIG_7
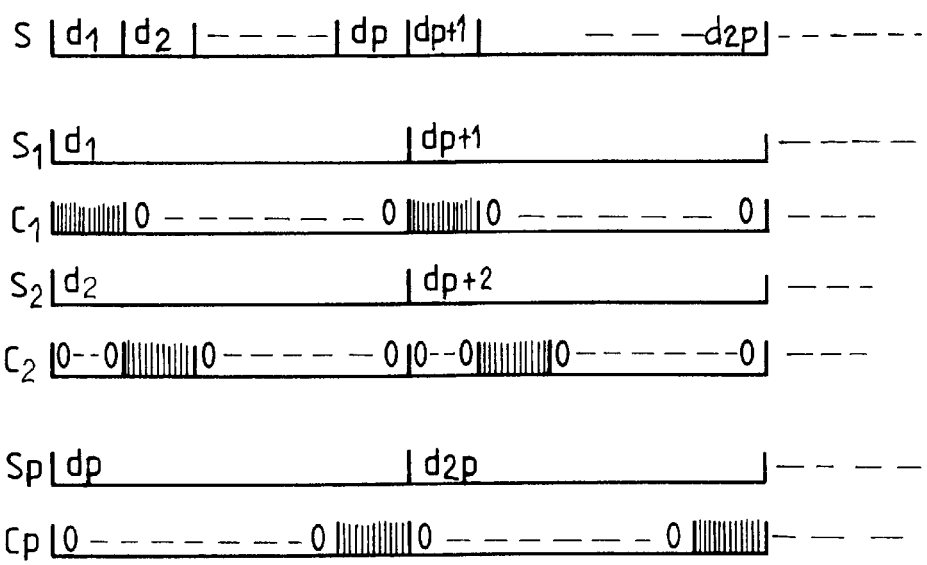

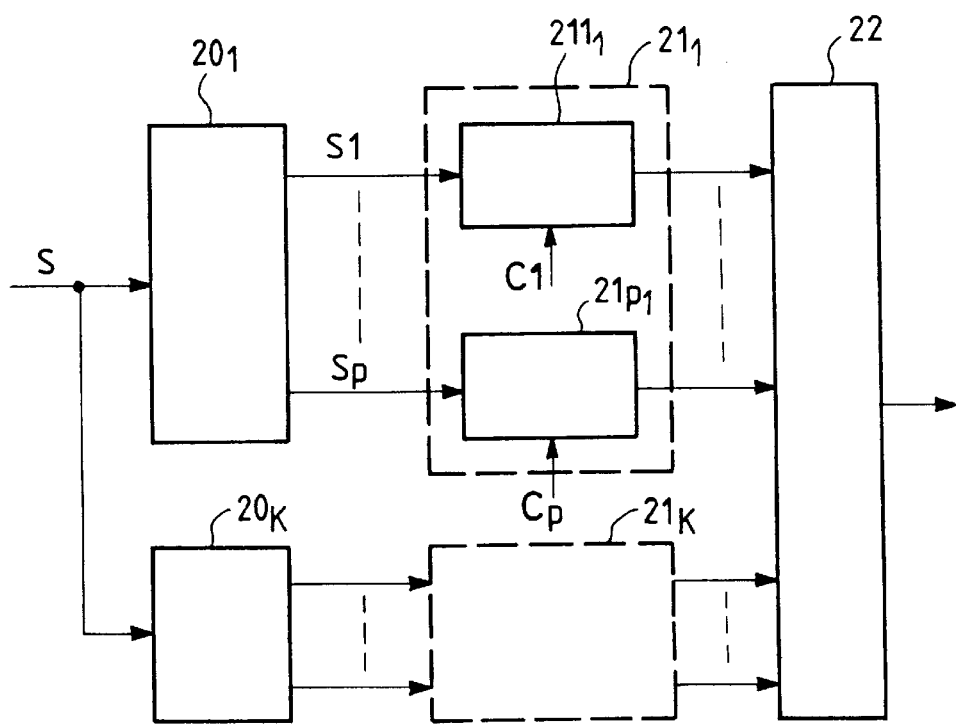
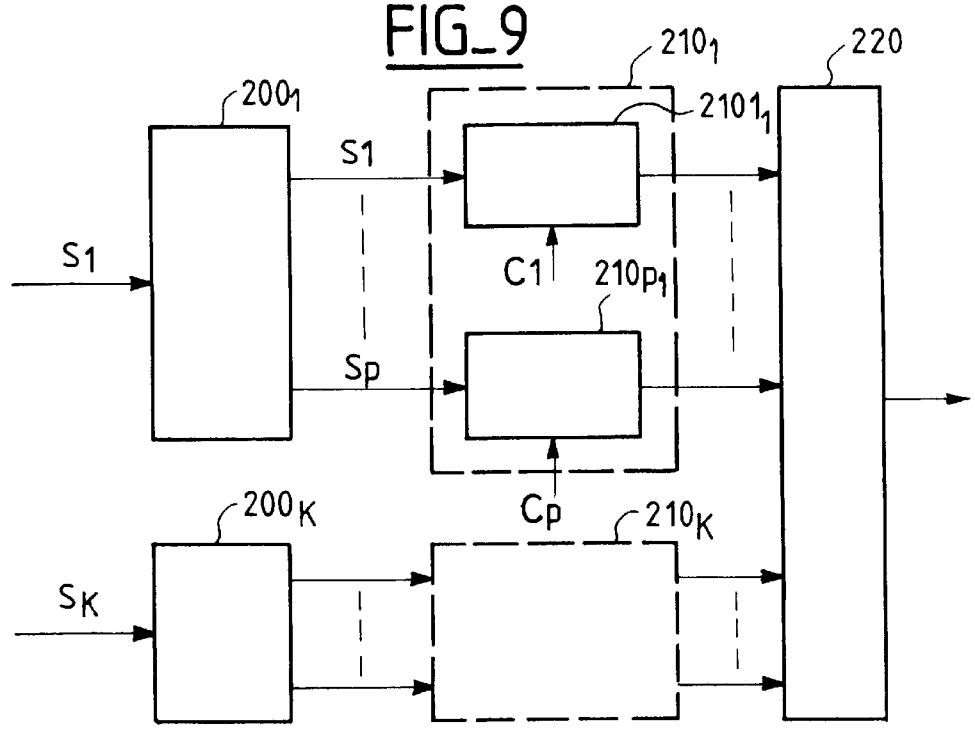

SPECTRUM SPREADING OR DESPREADING DEVICE, IN PARTICULAR FOR TRANSMISSION IN A CODE DIVISION MULTIPLE ACCESS CELLULAR MOBILE RADIO SYSTEM

The present invention is generally concerned with spread spectrum communication systems, i.e. systems in which spectrum spreading is applied to a sequence of data to be transmitted, on transmission, using a spreading code, and, conversely, despreading is effected on reception, in order to find the original sequence.

BACKGROUND OF THE INVENTION

Spreading an incident data sequence of N symbols, denoted (d1, d2, . . . , dN), using a code or length (or spreading factor) Q, denoted $c_Q$=(c1, c2, . . . , cQ), produces a sequence of length Q.N, which can be represented as follows:

(d1.c1, d1.c2, . . . , d1.cQ, d2.c1, d2.c2, . . . , dN.cQ)

where d1.c1 represents the multiplication of d1 by c1.

An alternative representation of the spread sequence of length Q.N is (d1.$c_Q$, d2.$c_Q$, . . . dN.$c_Q$) where d1.$c_Q$ represents the product of the symbol d1 by the spreading code $c_Q$.

A more general approach to spreading consists in having a different spreading code for each symbol of the input sequence, in which case the resulting spread sequence can be expressed in the form: (d1.$c_Q^{(1)}$,d2.$c_Q^{(2)}$, . . . ,dN.$c_Q^{(N)}$), $C_Q^{(1)}$ being the spreading code associated with the symbol d1. All the spreading codes preferably have the same length Q so that the resulting spread sequence has the length Q.N.

FIG. 1 outlines the principle of spreading, Ts designating the basic period (or symbol period) of a non-spread sequence and Tc designating the basic period (or "chip" period) of a spread sequence, Ts and Tc being related by the equation Ts=Q.Tc. In the figure dn and dn+1 correspond to two successive symbols of a non-spread incoming sequence and d'l and d'l+1 correspond to two successive basic symbols (or "chips") of the same spread symbol of the incoming sequence.

One benefit of the above systems is enabling a plurality of users to share the same frequency band by allocating different users different codes.

One important application is Code Division Multiple Access (CDMA) cellular mobile radio systems.

In these systems, a spread sequence is generally scrambled prior to transmission using a scrambling code (or sequence), for various reasons including in particular improved protection against interference, or to assure the confidentiality of the information transmitted.

The scrambling of an incoming sequence of L basic symbols or "chips", denoted (d'1, d'2, . . . , d'L), by a scrambling sequence of length L, denoted (v1, v2, . . . , vL), produces a sequence of length L that can be represented as follows:

(d'1.v1, d'2.v2, . . . , d'L.vL)

The scrambling sequence can be a very long, typically pseudo-random sequence. A sequence of this kind protects against interfering signals by rendering them random, at least over the duration of said scrambling sequence.

The scrambling sequence can also be a short sequence, typically of length L equal to the length Q of the spreading code (or an integer multiple thereof), as shown in FIG. 2, which uses the same type of representation as FIG. 1, and in which d"l and d"l+1 designate two successive basic symbols (or "chips") of the same spread and scrambled symbol of the incoming sequence. By allocating different scrambling sequences to cells re-using the same spreading codes, this in particular reduces interference between cells. One benefit of these short sequences is producing cyclostationary transmitted signals whose period is proportional to L, enabling efficient use of certain classes of algorithms, as described hereinafter. A description of cyclostationary signals can be found in the article "Exploitation of Spectral Redundancy in Cyclostationary Signals", IEEE Signal Processing Magazine, April 1991, pp. 14–36, for example.

Interference between users in the same cell can be reduced by using a decoding algorithm at the receiver enabling interfering signals to be identified as such and therefore rejected, in particular on the basis of the signals received and a knowledge of the codes of the various users. Examples of such decoding algorithms are so-called subtractive detection algorithms or joint-detection algorithms. If all the cyclostationary signals have the same short period, it is in particular possible to use algorithms exploiting their cyclostationary nature. Such algorithms are described, for example, in the article, "Interference Rejection in Digital Wireless Communications", IEEE Signal Processing Magazine, May 1997, pp. 37–62.

There is a need in these cellular mobile radio systems to be able to transmit data at a varying bit rate, in particular when the bit rate of the user itself varies (for example in the case of transmitting multimedia type data), or because, depending on the conditions for propagation of radio signals, a higher or lower degree of redundancy has to be introduced into the data to be transmitted in order to obtain a higher or lower degree of protection against transmission errors.

To increase the bit rate of data to be transmitted by a user for the same allocated frequency band (i.e. for the same duration Tc), allocating the user a plurality of codes of length Qm if the capacity of a single code of length Qm is exceeded is known per se.

A technique of the above kind has the particular disadvantage of leading to some complexity of implementation.

Another technique known per se, which avoids the above disadvantage, is to reduce the length of the code allocated to the user so that the user continues to transmit on only one code in order to increase the bit rate of the data to be transmitted by that user for the same allocated frequency band (i.e. for the same duration Tc). FIG. 3 summarizes the principle of a technique of this kind, and uses the same type of representation as FIGS. 1 and 2, but for two different bit rates of the incoming sequence, respectively identified by suffices 1 and 2, in this instance for three successive symbols dn, dn+1 and dn+2 of the incoming sequence, the symbol period corresponding to TS1 for symbol dn and Ts2 for symbols dn+1 and dn+2, and the code length corresponding to Q1 for symbol dn and Q2 for symbols dn+1 and dn+2.

A problem then arises due to the fact that a cellular mobile radio system may need to manage a plurality of users simultaneously whose instantaneous bit rates, and therefore whose spreading codes, are different and can separately take different values over time. The problem is that some algorithms, in particular decoding algorithms and especially the decoding algorithms referred to above, cannot, without modification, accept codes of different length for different users (whether at the same time or at different times).

A problem of the same kind would also arise in the case of allocating the same user a plurality of codes of different lengths.

A problem of the same kind would also arise in the case of allocating a user a code of variable length.

OBJECTS AND SUMMARY OF THE INVENTION

A particular aim of the present invention is to provide a solution to this problem avoiding the need to modify such algorithms to enable them to accept codes of different length.

In one aspect the present invention therefore consists in a spectrum spreading or despreading device, in particular for transmission in a code division multiple access cellular mobile radio system, the device including, for spreading or despreading an incoming sequence by means of a spreading code of length Q:
- means for distributing the data symbols of the incoming sequence into different sub-sequences, and
- means for spreading or despreading each of the sub-sequences using a spreading code of length Q0 that is a multiple of the length Q,
- said sub-sequence and said spreading codes of length Q0 that are applied to them being determined so that the sequence that would be obtained by superposing the spread or despread sub-sequences obtained in this way is the same as that which would be obtained by spreading or despreading the incoming sequence using the code of length Q.

In another aspect the present invention consists in a device for despreading an incoming sequence using K respective spreading code of respective length Qk (with ($1 \leq k \leq K$), the device including, for despreading the incoming sequence using each of the spreading codes of length Qk ($1 \leq k \leq K$):
- means for distributing the data symbols of the incoming sequence into difference sub-sequences, and
- means for despreading each of these sub-sequences by means of a spreading code of length Q0 which is a multiple of the length Qk,
- said sub-sequences and said spreading codes of length Q0 that are applied to them being determined so that the sequence that would be obtained by superposing the despread sub-sequences obtained in this way is the same as that which would be obtained by despreading the incoming sequence using the code of length Qk,
- and said length Q0 being common to the K codes.

In another aspect the present invention consists in a device for spreading K incoming sequences using K respective spreading codes of respective length Qk (with $1 \leq k \leq K$), the device including, for spreading the kth incoming sequence by means of the spreading code of length Qk ($1 \leq k \leq K$):
- means for distributing the data symbols of the incoming sequence into different sub-sequences, and
- means for spreading each of these sub-sequences by means of a spreading code of length Q0 which is a multiple of the length Q of the code,
- said sub-sequences and said spreading codes of length Q0 that are applied to them being determined so that the sequence that would be obtained by superposing the different spread-sequences obtained in this way is the same as that which would be obtained by spreading the incoming sequence using the code of length Qk,
- and said length Q0 being common to the K codes.

In accordance with another feature, said K spreading codes having a length less than or equal to a predetermined maximal length Qmax, said length Q0 is less than or equal to Qmax.

In accordance with another feature, the device further includes processor means receiving the spread or despread sub-sequences obtained for the K codes.

In accordance with another feature, said means for processing the despread sub-sequences obtained in this way for the K codes includes means for implementing a joint detection algorithm.

The present invention also has for its object a mobile station (or mobile terminal), as well as an entity, in particular base transceiver station, for a cellular mobile radiocommunication system, comprising a spreading or despreading device of the above kind.

BRIEF DESCRIPTION OF THE DRAWINGS

Other objects and features of the present invention will become apparent on reading the following description of one embodiment given with reference to the accompanying drawings, in which:

FIG. 1 is a diagram showing spectrum spreading of an incoming sequence,

FIG. 2 is a diagram showing spectrum spreading and scrambling of an incoming sequence, FIG. 3 is a diagram showing spectrum spreading in the case of a variable length spreading code, FIG. 4 is a block diagram of an example of a transmitter for a code division multiple access cellular mobile radio system to which the present invention can be applied, FIG. 5 is a block diagram of an example of a receiver for a code division multiple access cellular mobile radio system to which the present invention can be applied;

FIG. 6 is a block diagram of an example of a device in accordance with the invention, FIG. 7 is a diagram showing the operation of a device of the above kind, FIG. 8 is a block diagram of an example of a device in accordance with the invention, used on transmission, in particular in a code distribution multiple access cellular mobile radio system, FIG. 9 is a block diagram of an example of a device in accordance with the invention, used on reception, in particular in a code division multiple access cellular mobile radio system.

MORE DETAILED DESCRIPTION

The transmitter shown in FIG. 4 includes:

means 2 for spreading K incoming data sequences ST1 to STK using K respective spectrum codes $c_{Qi}^{(1)}$ to $c_{Qk}^{(K)}$ means 3 for scrambling K data sequences ST'l to ST'K from the means 2 using a scrambling code $c_E$, modulator means 4 receiving the various sequences ST"1 to ST"K from the means 3, transmitter means 5 receiving the modulated signals from the means 4 and supplying the corresponding radio signals.

The receiver shown in FIG. 5 includes:

receiver means 6, demodulator means 7, means 8 for descrambling a data sequence SR" from the means 7 using said scrambling code $c_E$, means 8 for despreading a data sequence SR' from the means 8 using K respective spreading codes $c_{Q1}^{(1)}$ to $c_{QK}^{(K)}$ and supplying K despread sequences SR1 to SRK to be used in the processing means 10 by a decoding algorithm of the type mentioned above to supply a received data sequence SR.

The device in accordance with the invention shown in FIG. 6 includes, for spreading or despreading an incoming sequence S using a spreading code C of length Q:

means 20 for dividing the data symbols of the incoming sequence into sub-sequences S1 to Sp means 21 (21l to 21p) for spreading or despreading each of these sub-sequences by means of a spreading code of length Q0 which is a multiple of the length Q (with Q0/Q equal to p), the various codes of length Q0 applied to the various sub-sequences being respectively denoted C1 to Cp.

Said sub-sequences S1 to Sp and said codes C1 to Cp are determined so that the sequence that would be obtained by superposing the various spread or despread sub-sequences obtained in this way is the same as that which would be obtained by spreading or despreading the incoming sequence by means of the code C of length Q.

FIG. 7 shows one example of the operation of a device of the above kind.

The incoming sequence S concerned is formed of the symbols:

d1, . . . , dp, . . . d2p, . . . etc.

In the example shown in FIG. 7:

the sequence S1 is formed of the symbols:

d1, dp+1, d2p+1, . . . etc.

the sequence S2 is formed of the symbols:

d2, dp+2, d2p+2, . . . etc.

the sequence Sp is formed of the symbols:

dp, d2p, d3p, . . . etc.

The code C concerned is:

C=(c1, c2, . . . CQ)

In the example shown in FIG. 7 the codes C1, . . . , Cp are:

C1=(c1, c2, . . . cQ, 0, . . . 0)

C2=(0, . . . , 0, c1, c2, . . . CQ, 0, . . . 0)

Cp=(0, . . . 0, c1, c2, . . . cQ)

For clarity, in FIG. 7 the various codes C1, . . . , Cp are represented opposite the various sub-sequences S1, . . . , Sp to which they apply.

This example demonstrates that the sequence that would be obtained by superposing the various spread or despread sub-sequences obtained in this way is the same as that which would be obtained by spreading or despreading the incoming sequence by means of the code of length Q.

Other examples would of course be possible, and clearly they cannot all be described here.

The device in accordance with the invention is used in particular in the despreading means 9 from FIG. 5. In this case the device in accordance with the invention can be used in a base transceiver station or in a mobile terminal to despread an incoming data sequence, not only by means of the spreading code allocated to a given user (or by means of one of the codes allocated to that user if they are allocated more than code), but also by means of the codes allocated to other users (and possibly other codes allocated to the user in question), in order to use a decoding algorithm such as those mentioned hereinabove.

In an application of the above kind, a device for despreading an incoming sequence by means of K respective spreading codes of respective length Qk (with $1 \leq k \leq K$) includes, as shown in FIG. 8, for despreading the incoming sequence by means of each of the K spreading codes:

means such as the means $20_1$ to $20_K$ for distributing the data symbols of the incoming sequence to various sub-sequences, and means such as the means $21_1$ ($211_1$ to $21p_1$) to $21_K$ for despreading each of these sub-sequences by means of a spreading code of length Q0 which is a multiple of the length (such as Q1 to QK) of the corresponding code.

For each value of k ($1 \leq k \leq K$) said subsequences and said spreading codes which are applied to them are determined so that the sequence that would be obtained by superposing the despread sub-sequences obtained in this way is the same as that which would be obtained by despreading the incoming sequence by means of the code of length Qk, and said length Q0 is common to the K codes.

As indicated hereinabove, this avoids the need to modify the decoding algorithm used by the means 22 receiving sub-sequences from the means such as the means $21_1$ to $21_K$ in order to have it accept codes of different length.

The device in accordance with the invention used on transmission, in particular on transmission in a code division multiple access cellular mobile radio system, can be used in the spreading means 2 from FIG. 4. In this case, the device in accordance with the invention can be used in a base transceiver station to spread different incoming data sequences corresponding to different users served by that base transceiver station; it can also be used in a mobile terminal, by allocating different spreading codes to that user.

In an application of the above kind, a device for spreading K incoming sequences such as S1 to SK using K respective spreading codes of respective length Qk (with $1 \leq k \leq K$) includes, as shown in FIG. 9:

means such as the means $200_1$ to $200_K$ for distributing the data symbols of the incoming sequence such as S1 to SK applied to them to various subsequences, and means such as the means $210_1$ ($2101_1$ to $210p_1$) to $210_K$ for spreading each of these sub-sequences by means of a spreading code of length Q0 which is a multiple of the length Qk.

For each value of k ($1 \leq k \leq K$) said sub-sequences and said spreading codes which are applied to them are determined so that the sequence that would be obtained by superposing the spread sub-sequences obtained in this way is the same as that which would be obtained by spreading the incoming sequence by means of the code of length Qk, and said length Q0 is common to the K codes.

This also avoids the need to modify any encoding algorithm used in the means 220 receiving sub-sequences from the means such as the means $210_1$ to $210_K$ in order to have it accept codes of different length.

Implementing the various means constituting the block diagram of FIGS. 6, 8 and 9 will not represent any particular problem to the skilled person, so such means need not be described here in more detail than by reference to their function.

Note that these diagrams are theoretical diagrams but clearly in practice the structure can be different, in particular the various component parts of the diagrams can be grouped together in common signal processor means.

Note also that what has been described can be varied in diverse ways; in particular, for improved efficiency, the spreading code can be different for the various symbols of a data sequence to which it applies.

What is claimed is:

1. Spectrum spreading or despreading device, in particular for transmission in a code division multiple access cellular mobile radio system, the device including, for spreading or despreading an incoming sequence by means of a spreading code of length Q:

means for distributing the data symbols of the incoming sequence into different sub-sequences, and means for spreading or despreading each of the sub-sequences using a spreading code of length Q0 that is a multiple of the length Q, said sub-sequence and said spreading codes of length Q0 that are applied to them being determined so that the sequence that would be obtained by superposing the spread or despread sub-sequences obtained in this way is the same as that which would be obtained by spreading or despreading the incoming sequence using the code of length Q.

2. Device according to claim 1, wherein, said K spreading codes having a length less than or equal to a predetermined maximal length Qmax, said length Q0 is less than or equal to Qmax.

3. Device according to claim 1, further including processor means receiving the spread or despread sub-sequences obtained for the K codes. sequences obtained for the K codes.

4. Device according to claim 3, wherein said means for processing the despread sub-sequences obtained in this way for the K codes includes means for implementing a joint detection algorithm.

5. A mobile station for a cellular mobile radiocommunication system, comprising a device according to claim 1.

6. Device for despreading an incoming sequence using K respective spreading codes of respective length Qk (with $1 \leq k \leq K$), the device including, for despreading the incoming sequence using each of the spreading codes of length Qk ($1 \leq k \leq K$):

means for distributing the data symbols of the incoming sequence into different sub-sequences, and means for despreading each of these sub-sequences by means of a spreading code of length Q0 which is a multiple of the length Qk, said sub-sequences and said spreading codes of length Q0 that are applied to them being determined so that the sequence that would be obtained by superposing the despread sub-sequences obtained in this way is the same as that which would be obtained by despreading the incoming sequence using the code of length Qk, and said length Q0 being common to the K codes.

7. Device for spreading K incoming sequences using K respective spreading codes of respective length Qk (with $1 \leq k \leq K$), the device including, for spreading the kth incoming sequence by means of the spreading code of length Qk ($1 \leq k \leq K$):

means for distributing the data symbols of the incoming sequence into different sub-sequences, and means for spreading each of these sub-sequences by means of a spreading code of length Q0 which is a multiple of the length Q of the code, said sub-sequences and said spreading codes of length Q0 that are applied to them being determined so that the sequence that would be obtained by superposing the different spread sub-sequence obtained in this way is the same as that which would be obtained by spreading the incoming sequence using the code of length Qk, and said length Q0 being common to the K codes.

8. An entity, in particular base transceiver station, for a cellular mobile radiocommunication system, comprising a device according to any of claims 1 to 6.

* * * * *